US011962350B2

(12) United States Patent
Palese et al.

(10) Patent No.: US 11,962,350 B2
(45) Date of Patent: Apr. 16, 2024

(54) PHOTONIC INTEGRATED CIRCUIT WITH INDEPENDENT UNIT CELLS HAVING MULTI-POLARIZATION SENSITIVITY

(71) Applicant: Raytheon Company, Waltham, MA (US)

(72) Inventors: Stephen P. Palese, Redondo Beach, CA (US); Richard L. Kendrick, San Mateo, CA (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/654,200

(22) Filed: Mar. 9, 2022

(65) Prior Publication Data

US 2023/0291480 A1 Sep. 14, 2023

(51) Int. Cl.
*H04B 10/516* (2013.01)
*H04B 10/112* (2013.01)
*H04B 10/61* (2013.01)

(52) U.S. Cl.
CPC ..... *H04B 10/5161* (2013.01); *H04B 10/1123* (2013.01); *H04B 10/6162* (2013.01)

(58) Field of Classification Search
CPC ............ H04B 10/5161; H04B 10/1123; H04B 10/6162
USPC ........................................................ 398/128
See application file for complete search history.

(56) References Cited

U.S. PATENT DOCUMENTS

| | | | |
|---|---|---|---|
| 3,975,628 A | | 8/1976 | Graves et al. |
| 4,720,642 A | * | 1/1988 | Marks .................... B82Y 10/00 257/E33.044 |
| 6,856,284 B1 | * | 2/2005 | Cangiani .................. H01Q 3/34 342/372 |
| 7,408,507 B1 | | 8/2008 | Paek et al. |
| 7,729,572 B1 | | 6/2010 | Pepper et al. |
| 7,949,030 B2 | | 5/2011 | Volodin |
| 8,068,235 B1 | | 11/2011 | Marron et al. |
| 10,020,882 B2 | | 7/2018 | Uysal et al. |
| 10,123,327 B2 | | 11/2018 | Hu et al. |
| 10,838,222 B2 | | 11/2020 | Khachaturian et al. |
| 11,029,465 B1 | | 6/2021 | Rakowski et al. |
| 11,320,588 B1 | * | 5/2022 | Mazed .................... G16H 10/40 |
| 11,575,204 B1 | * | 2/2023 | Veysoglu ................. H01Q 3/34 |
| 11,579,360 B2 | * | 2/2023 | Bian .................. G02B 6/12004 |

(Continued)

FOREIGN PATENT DOCUMENTS

| | | | |
|---|---|---|---|
| CN | 105026970 A | * 11/2015 | ......... G02B 6/12033 |
| EP | 3761528 A1 | 1/2021 | |

OTHER PUBLICATIONS

Yengst et al., "Digital Input Circuit Design for Photonic Integrated Circuit", U.S. Appl. No. 17/174,173, filed Feb. 11, 2021, 59 pages.

(Continued)

*Primary Examiner* — Abbas H Alagheband

(57) ABSTRACT

An apparatus includes a photonic integrated circuit having an optical phased array, where the optical phased array includes multiple unit cells. Each unit cell includes (i) at least one antenna element configured to transmit or receive optical signals and (ii) a modulator configured to phase-shift the optical signals transmitted or received by the antenna element. Each unit cell is configured to transmit or receive light having multiple polarizations in the optical signals.

20 Claims, 9 Drawing Sheets

(56) References Cited

U.S. PATENT DOCUMENTS

| | | | |
|---|---|---|---|
| 2006/0239312 A1 | 10/2006 | Kewitsch et al. | |
| 2009/0091500 A1* | 4/2009 | Haziza | H01Q 3/44 |
| | | | 343/700 MS |
| 2014/0376001 A1* | 12/2014 | Swanson | G01S 7/4817 |
| | | | 356/479 |
| 2015/0293224 A1* | 10/2015 | Eldada | G01S 17/89 |
| | | | 250/206.1 |
| 2015/0346340 A1* | 12/2015 | Yaacobi | G01S 7/499 |
| | | | 356/5.11 |
| 2016/0094016 A1 | 3/2016 | Beach et al. | |
| 2017/0016990 A1* | 1/2017 | Yaacobi | G01S 7/4813 |
| 2017/0234984 A1 | 8/2017 | Khial et al. | |
| 2017/0324162 A1 | 11/2017 | Khachaturian et al. | |
| 2018/0039154 A1 | 2/2018 | Hashemi et al. | |
| 2018/0107091 A1 | 4/2018 | Hosseini et al. | |
| 2019/0253125 A1* | 8/2019 | Apaydin | H01Q 21/22 |
| 2020/0192179 A1 | 6/2020 | Hajimiri | |
| 2020/0284910 A1 | 9/2020 | Yaacobi et al. | |
| 2020/0348544 A1* | 11/2020 | Levy | G02F 1/0121 |
| 2020/0403697 A1* | 12/2020 | Perlot | G02B 6/4246 |
| 2021/0057817 A1* | 2/2021 | Lenive | H01Q 3/36 |
| 2021/0149227 A1 | 5/2021 | Lee et al. | |
| 2023/0093054 A1* | 3/2023 | Gunzelmann | H01Q 3/2676 |
| | | | 343/702 |

OTHER PUBLICATIONS

Palese et al., "Photonic Integrated Circuit-Based Communication Transmit/Receive System", U.S. Appl. No. 17/174,132, filed Feb. 11, 2021, 16 pages.
Palese et al., "Photonic Integrated Circuit-Based Coherently Phased Array Laser Transmitter", U.S. Appl. No. 17/162,860, filed Jan. 29, 2021, 35 pages.
Kendrick et al., "Photonic Integrated Circuit-Based Optical Phased Array Phasing Technique", U.S. Appl. No. 17/174,180, filed Feb. 11, 2021, 60 pages.
Namdar et al., "Photonic Integrated Circuit-Based Optical Phased Array Calibration Technique", U.S. Appl. No. 17/174,197, filed Feb. 11, 2021, 61 pages.
Kendrick et al., "System and Method for Calibrating Pic-Based Optical Phased Array Transmitter and Receiver", U.S. Appl. No. 17/150,797, filed Jan. 15, 2021, 34 pages.
Shamee, "Photonic Integrated Circuit-Based Optical Phased Array Communication System", U.S. Appl. No. 17/643,114, filed Dec. 7, 2021, 28 pages.
Abediasl et al., "Monolithic optical phased-array transceiver in a standard SOI CMOS process," Optical Society of America, Optics Express 6509, vol. 23, No. 5, 2015, 11 pages.
Blumenthal et al., "Silicon Nitride in Silicon Photonics," Proceedings of the IEEE, vol. 106, No. 12, Dec. 2018, 23 pages.
Essiambre et al., "Capacity Limits of Optical Fiber Networks," Journal of Lightwave Technology, vol. 28, No. 4, Feb. 2010, 40 pages.
Stralka et al., "OFDM-based Wideband Phased Array Radar Architecture", IEEE Radar Conference—Proceedings, 2008, 6 pages.
Sousa et al., "Adaptive Beamforming Applied to OFDM Systems," MDPI Article, Sensors, 18(10), 2018, 15 pages.
Wikipedia, "Orthogonal frequency-division multiplexing," Dec. 2020, 26 pages.
Creedon et al., "High efficiency coherent beam combining of semiconductor optical amplifiers," Optics Letters, vol. 37, No. 23, Dec. 2012, 3 pages.
Fatemi et al., "A Nonuniform Sparse 2-D Large-FOV Optical Phased Array With a Low-Power PWM Drive," IEEE Journal of Solid-State Circuits, vol. 54, Issue 5, May 2019, 16 pages.
Heidel et al., "A Review of Electronic-Photonic Heterogeneous Integration at DARPA," IEEE Journal of Selected Topics in Quantum Electronics, vol. 22, No. 6, Nov. 2016, 9 pages.
Kim et al., "A Single-Chip Optical Phased Array in a Wafer-Scale Silicon Photonics / CMOS 3D-Integration Platform," EEE Journal of Solid-State Circuits, vol. 54, Issue 11, Nov. 2019, 14 pages.
Komljenovic et al., "On-chip calibration and control of optical phased arrays," Optics Express, vol. 26, No. 3, Jan. 2018, 12 pages.
Larocque et al., "Beam steering with ultracompact and low-power silicon resonator phase shifters," Optics Express, vol. 27, No. 24, Nov. 2019, 16 pages.
Li et al., "Fast Optical Phased Array Calibration Technique for Random Phase Modulation LiDAR," IEEE Photonics Journal, vol. 11, No. 1, Feb. 2019, 10 pages.
Marron et al., "Atmospheric turbulence correction using digital holographic detection: experimental results," Optics Express, vol. 17, No. 14, Jul. 2009, 14 pages.
Marron et al., "Extended-range digital holographic imaging," Proc. of SPIE, vol. 7684, 76841J-1, 2010, 6 pages.
Mehta et al., "An Optically Sampled ADC in 3D Integrated Silicon-Photonics/65nm CMOS," IEEE 2020 Symposium on VLSI Technology Digest of Technical Papers—THL.3, 2020, 2 pages.
Orcutt et al., "Open foundry platform for high-performance electronic-photonic integration," Optics Express, vol. 20, No. 11, May 2012, 11 pages.
Sayyah et al., "Two-dimensional pseudo-random optical phased array based on tandem optical injection locking of vertical cavity surface emitting lasers," Optics Express, vol. 23, No. 15, Jul. 2015, 12 pages.
Zhang et al., "Phase Calibration of On-Chip Optical Phased Arrays via Interference Technique," IEEE Photonics Journal, vol. 12, No. 2, Apr. 2020, 11 pages.
Kendrick et al., "Photonic Integrated Circuit Distance Measuring Interferometer," U.S. Appl. No. 16/929,907, filed Jul. 15, 2020, 35 pages.
International Search Report and Written Opinion of the International Searching Authority dated Feb. 24, 2022 in connection with International Patent Application No. PCT/US2021/059421, 16 pages.
International Search Report and Written Opinion of the International Searching Authority dated Apr. 8, 2022 in connection with International Patent Application No. PCT/US2021/064527, 10 pages.
He et al., "Review of Photonic Integrated Optical Phased Arrays for Space Optical Communication," IEEE Access, vol. 8, Oct. 2020, 16 pages.

\* cited by examiner

PHOTONIC INTEGRATED CIRCUIT WITH INDEPENDENT UNIT CELLS HAVING MULTI-POLARIZATION SENSITIVITY

TECHNICAL FIELD

This disclosure relates generally to optical systems. More specifically, this disclosure relates to a photonic integrated circuit with independent unit cells having multi-polarization sensitivity.

BACKGROUND

Next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

SUMMARY

This disclosure relates to a photonic integrated circuit with independent unit cells having multi-polarization sensitivity.

In a first embodiment, an apparatus includes a photonic integrated circuit having an optical phased array, where the optical phased array includes multiple unit cells. Each unit cell includes (i) at least one antenna element configured to transmit or receive optical signals and (ii) a modulator configured to phase-shift the optical signals transmitted or received by the antenna element. Each unit cell is configured to transmit or receive light having multiple polarizations in the optical signals.

In a second embodiment, a method includes using an optical phased array of a photonic integrated circuit to transmit or receive optical signals, where the optical phased array includes multiple unit cells. Each unit cell includes (i) at least one antenna element configured to transmit or receive the optical signals and (ii) a modulator configured to phase-shift the optical signals transmitted or received by the antenna element. Each unit cell transmits or receives light having multiple polarizations in the optical signals.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
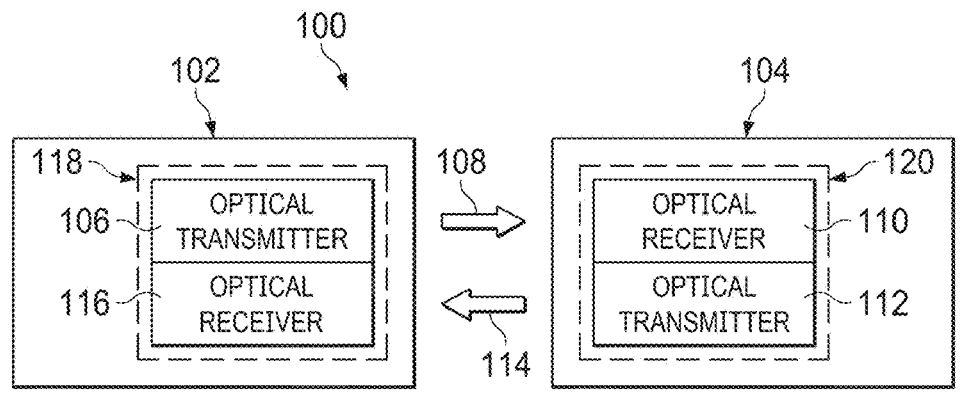
FIG. 1 illustrates an example system supporting photonic integrated circuit-based communication according to this disclosure.

FIGS. 1 through 14, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, next-generation optical phased arrays (OPAs) are being designed for use in free-space optical systems, which refer to systems where optical signals are transmitted and received through free space rather than through optical fibers. These optical phased arrays are often implemented using photonic integrated circuits (PICs). A photonic integrated circuit refers to a device that integrates multiple photonic or light-based functions into the device. A photonic integrated circuit may include an array of nano-antennas, which represent extremely small antennas that can be used for transmitting or receiving optical signals.

Unfortunately, nano-antennas used in typical optical phased arrays are able to transmit or receive light using a single polarization (namely S polarization or P polarization). This can cause problems with optical communication links in which an optical transmitter and an optical receiver are able to rotate relative to one another or where propagation of optical signals depolarizes the optical signals (such as when the optical signals propagate through the atmosphere). The relative rotation between an optical transmitter and an optical receiver can occur in virtually all applications except those involving fixed ground-to-fixed ground terminals, which severely limits use of these optical phased arrays. While it may be possible to utilize two separate nano-antenna arrays (one for each polarization) in a system, this increases the size, weight, power, and cost (SWaP-C) of the overall system.

This disclosure provides photonic integrated circuits with independent unit cells having multi-polarization sensitivity. As described in more detail below, a photonic integrated circuit may include multiple unit cells, and each unit cell provides dual-polarization or other multi-polarization sensitivity. For example, in some cases, each unit cell may include multiple nano-antennas arranged substantially orthogonally to one another, and the multiple nano-antennas can transmit and/or receive optical signals using different polarizations (either simultaneously or separately). In other cases, each unit cell may include a nano-antenna supporting multi-polarization functionality so that the nano-antenna can transmit and/or receive optical signals using different polarizations.

This helps to provide polarization diversity and multi-polarization sensitivity for the unit cells, which allows the photonic integrated circuits to be used effectively regardless of the relative rotation between an optical transmitter and an optical receiver. Moreover, this can be achieved using a single array of unit cells, which can provide size, weight, power, and cost reductions compared to the use of multiple nano-antenna arrays. In addition, in some embodiments, these nano-antenna arrays may be fabricated using conventional manufacturing techniques, such as complementary metal oxide semiconductor (CMOS) silicon fabrication techniques, which can help to further reduce the costs of the nano-antenna arrays.

FIG. 1 illustrates an example system 100 supporting photonic integrated circuit-based communication according to this disclosure. As shown in FIG. 1, the system 100 includes two nodes 102 and 104 that communicate with one another optically. Each node 102 and 104 represents a ground-, air-, or space-based system that can transmit and/or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, and/or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, and/or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same PIC-based structure to be used for both transmission and reception purposes. Similarly, while the optical transmitter 112 and the optical receiver 110 are shown here as separate components, they can be integrated into a single optical transceiver 120. This may allow, for instance, the same PIC-based structure to be used for both transmission and reception purposes. As described in more detail below, each of the optical transmitters 106 and 112, optical receivers 110 and 116, or optical transceivers 118 and 120 includes at least one PIC-based optical phased array with independent unit cells having multi-polarization sensitivity, which can be used to transmit and/or receive the optical signals 108 and/or 114.

In many applications, at least one node 102 or 104 may rotate relative to the other node 104 or 102 during operation. As a result, the angular orientation of each node 102 and 104 may vary over time relative to the other node 104 and 102. If the optical transmitters 106, 112, optical receivers 110, 116, or optical transceivers 118, 120 of the nodes 102 and 104 include nano-antenna arrays that are sensitive to a single polarization of light, this relative rotation of the nodes 102 and 104 can interfere with (or even prevent) effective optical communication between the nodes 102 and 104. According to this disclosure, the optical transmitters 106, 112, optical receivers 110, 116, or optical transceivers 118, 120 may be implemented using photonic integrated circuits with independent unit cells having multi-polarization sensitivity as described in more detail below. This enables effective optical communication between the nodes 102 and 104 regardless of changes in orientation of the nodes 102 and 104 with respect to each other. In some embodiments, it is also possible to communicate multiple optical signals 108 or 114 between the nodes 102 and 104 in a single direction at the same time, such as when the nodes 102 and 104 have a substantially 0° relative rotation with respect to each other.

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very large distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. Optical transmitters, receivers, or transceivers may be used in non-communication-related optical applications, such as laser detection and ranging (LADAR) applications or other applications that can use polarimetric processing with PIC-based optical phased arrays. In general, this disclosure is not limited to any particular application of the optical transmitters, receivers, and transceivers.

Although FIG. 1 illustrates one example of a system 100 supporting photonic integrated circuit-based communication, various changes may be made to FIG. 1. For example, while only two nodes 102 and 104 are shown here, the system 100 may include any suitable number of nodes that engage in any suitable unidirectional, bidirectional, or other communications or other interactions with each other. Also, each node of the system 100 may include any suitable number of optical transmitters, receivers, or transceivers that communicate or otherwise use any number of optical signals. In addition, the system 100 is shown in simplified form here and may include any number of additional components in any suitable configuration as needed or desired.

Figure 2:
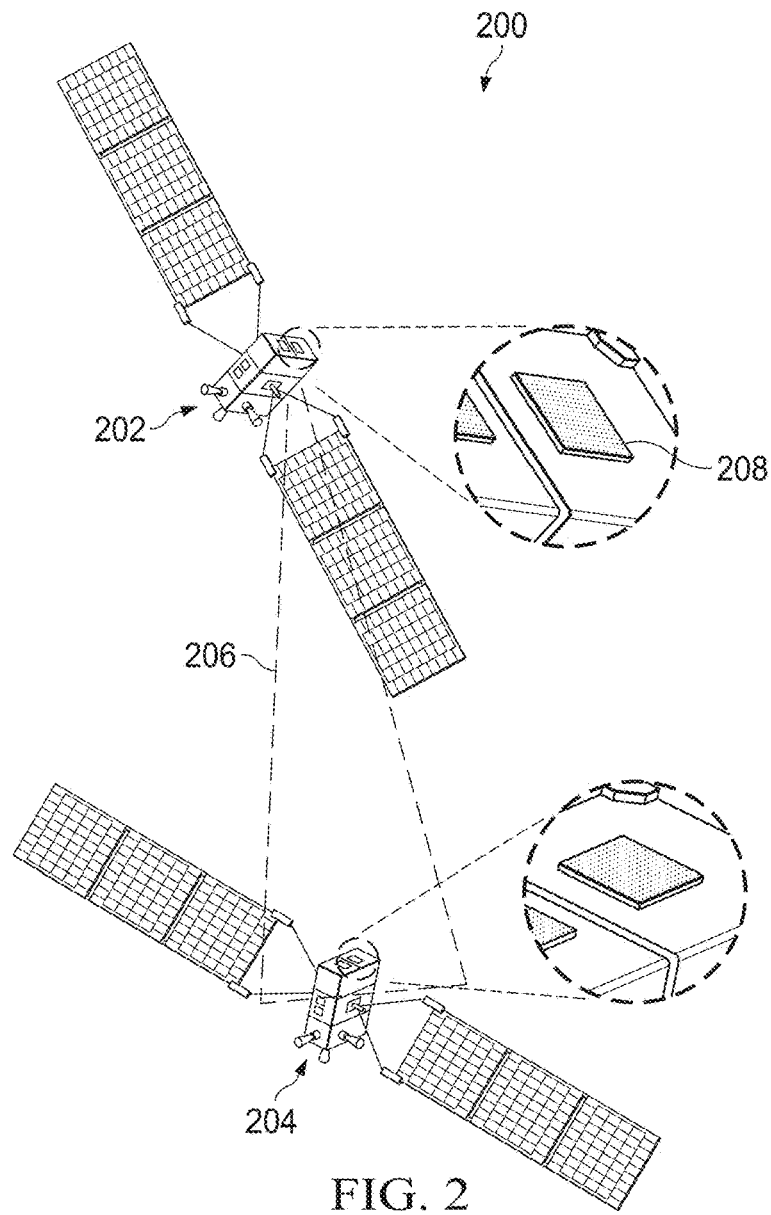
FIG. 2 illustrates a specific example system supporting photonic integrated circuit-based communication according to this disclosure.

FIG. 2 illustrates a specific example system 200 supporting photonic integrated circuit-based communication according to this disclosure. As shown in FIG. 2, the system 200 includes two satellites 202 and 204 that can engage in unidirectional or bidirectional communication with one another. In this particular example, the satellite 202 is shown as transmitting an optical signal 206 towards the satellite 204. Each satellite 202 and 204 includes one or more PIC-based optical transmitters, receivers, or transceivers 208 that enable the satellites 202 and 204 to engage in free-space optical communications. Thus, the satellites 202 and 204 may represent specific implementations of the nodes 102 and 104 described above, and the PIC-based transmitters, receivers, or transceivers 208 may represent specific implementations of the optical transmitters 106, 112, optical receivers 110, 116, or optical transceivers 118, 120 described above. Note that the satellites 202 and 204 shown here may represent any suitable satellites that engage in optical communications. For example, the satellites 202 and 204 may represent satellites in a proliferated low Earth orbit constellation, although other types of satellites in other orbits or constellations may be used.

As can be seen in FIG. 2, the satellites 202 and 204 are generally free to rotate relative to one another. In other words, the angular orientation of each satellite 202 and 204 may vary over time relative to the other satellite 204 and 202. If each PIC-based transmitter, receiver, or transceiver 208 includes a nano-antenna array that is sensitive to a single polarization of light, this relative rotation of the satellites 202 and 204 can interfere with or prevent effective optical communication between the satellites 202 and 204. According to this disclosure, the PIC-based transmitters, receivers, or transceivers 208 may be implemented using photonic integrated circuits with independent unit cells having multi-polarization sensitivity as described in more detail below. This enables effective optical communication between the satellites 202 and 204 regardless of changes in orientation of the satellites 202 and 204 with respect to each other. In some embodiments, it is also possible to send multiple optical signals 206 between the satellites 202 and 204 in a single direction at the same time, such as when the satellites 202 and 204 have a substantially 0° relative rotation with respect to each other.

Although FIG. 2 illustrates a specific example of a system 200 supporting photonic integrated circuit-based communication, various changes may be made to FIG. 2. For example, while only two satellites 202 and 204 are shown here, the system 200 may include any suitable number of satellites that engage in any suitable unidirectional, bidirectional, or other communications or other interactions with each other. Also, each satellite of the system 200 may include any suitable number of optical transmitters, receivers, or transceivers that communicate or otherwise use any number of optical signals. In addition, while the example system 200 shown here uses satellites, other systems may use other types of nodes that engage in optical communications. As a specific example, nodes using PIC-based optical transmitters, receivers, or transceivers may be used in a ground-based free-space optical communication system to support mid- and last-mile communications.

Figure 3:
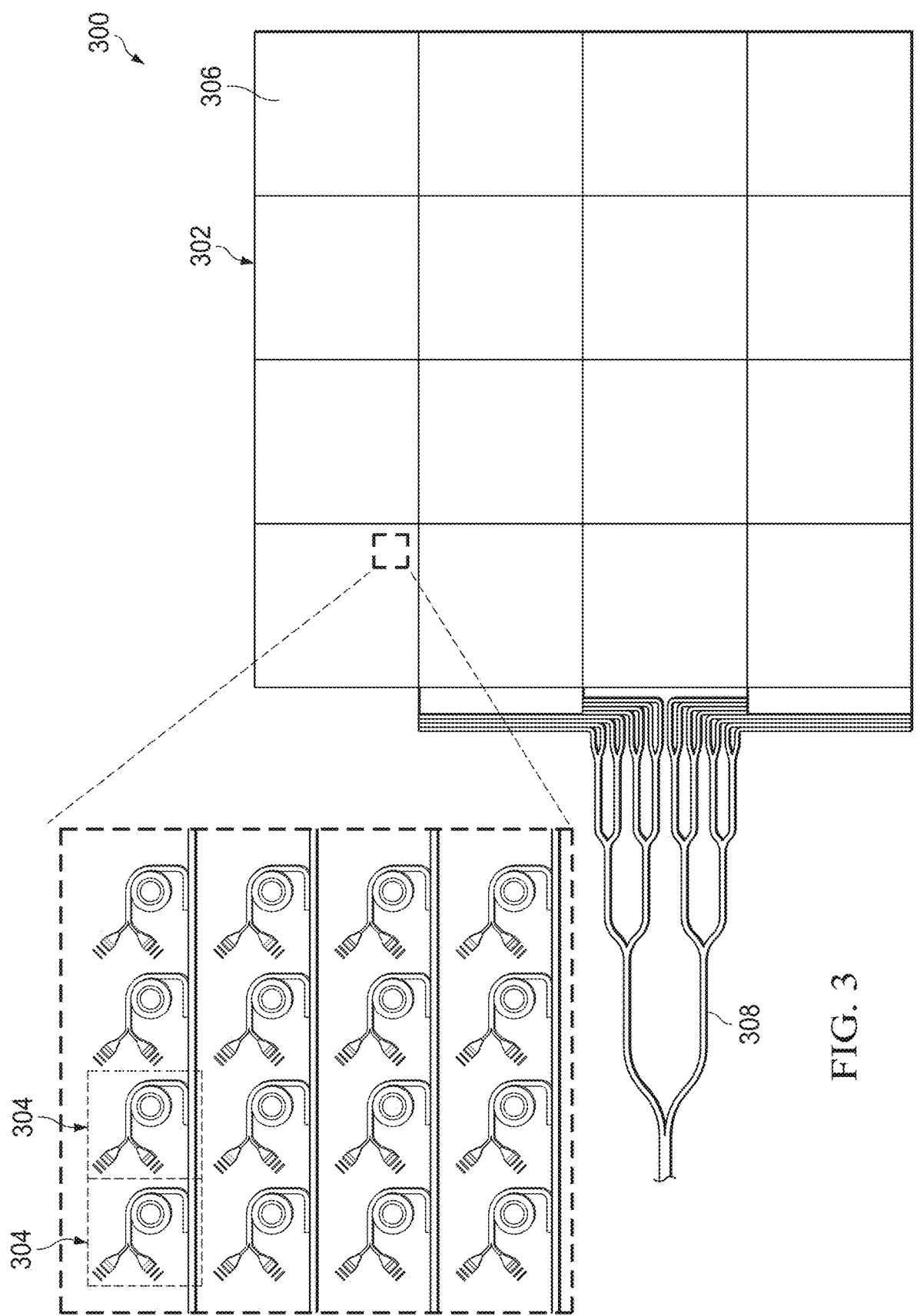
FIG. 3 illustrates an example photonic integrated circuit-based optical device according to this disclosure.

FIG. 3 illustrates an example photonic integrated circuit-based optical device 300 according to this disclosure. For ease of explanation, the optical device 300 may be described as being used to at least partially implement each of the optical transmitters 106, 112, optical receivers 110, 116, or optical transceivers 118, 120 in FIG. 1 or each of the optical transmitters, receivers, or transceivers 208 of FIG. 2. However, the optical device 300 may be used in any other suitable device and in any other suitable system.

As shown in FIG. 3, the optical device 300 includes a PIC-based optical phased array 302, where the optical phased array 302 includes a large number of unit cells 304. Each unit cell 304 is configured to transmit and/or receive one or more optical signals. The optical phased array 302 can include any suitable number of unit cells 304, possibly up to and including a very large number of unit cells 304. In some embodiments, for example, the optical phased array 302 may include an array of unit cells 304 up to a size of 1024×1024 (meaning over one million unit cells 304) or even larger. Also, the optical phased array 302 may include multiple groups 306 of unit cells 304, where the unit cells 304 in each group 306 are fed an outgoing optical signal or are used to generate an incoming optical signal. In some embodiments, for example, the optical phased array 302 may include sixteen groups 306 of unit cells 304 arranged in a 4×4 pattern, although other numbers and arrangements of groups 306 of unit cells 304 may be used. The size of the optical phased array 302 is based, at least in part, on the number and size of the unit cells 304 and the number and arrangement of the groups 306. As a particular example, in some cases, the optical phased array 302 may be square with edges of about 1.6 mm in length. However, the optical phased array 302 may be scaled to smaller or larger sizes as needed or desired.

As described in more detail below, each unit cell 304 includes one or more antenna elements, one or more signal pathways, and a modulator. For each unit cell 304, the antenna element(s) can physically transmit and/or receive one or more optical signals, the signal pathway(s) can transport optical signals to and/or from the antenna element(s), and the modulator can control the phase of optical signals transmitted and/or received by the antenna element(s). This enables the optical phased array 302 to transmit and/or receive optical signals using an array of nano-antenna elements, where (i) each unit cell 304 can be controlled independently and (ii) each unit cell 304 can provide multi-polarization sensitivity (meaning each unit cell 304 can transmit and/or receive optical signals having different polarizations, such as S and P polarizations).

A feed network 308 is used to split outgoing optical signals for transmission by the optical phased array 302 and/or to combine incoming optical signals received by the optical phased array 302. For example, the feed network 308 may include a collection of splitters/combiners that can divide optical signals flowing in one direction through the feed network 308 and combine optical signals flowing in the opposite direction through the feed network 308. In some cases, the feed network 308 can be designed to feed optical signals to and/or receive optical signals from the groups 306 of unit cells 304. Additional components within the optical phased array 302 (such as within each group 306 of unit cells 304) may be used to provide optical signals to and/or receive optical signals from the individual unit cells 304 within the optical phased array 302. The feed network 308 includes any suitable structures configured to distribute and/or combine optical signals. While a specific configuration of a feed network 308 is shown here, the actual design of the feed network 308 can vary based on a number of factors, such as the design of the optical phased array 302.

Although FIG. 3 illustrates one example of a photonic integrated circuit-based optical device 300, various changes may be made to FIG. 3. For example, the optical phased array 302 may have any other suitable size and shape, and any other suitable feed network 308 may be used. Also, while the feed network 308 is shown here as residing next to the optical phased array 302, the feed network 308 may be located in any other suitable position(s), such as under the optical phased array 302.

FIGS. 4 through 7 illustrate example independent unit cells 304 having multi-polarization sensitivity in a photonic integrated circuit-based optical device according to this disclosure. For ease of explanation, the unit cells 304 of FIGS. 4 through 7 may be described as being used in the optical device 300 in order to at least partially implement each of the optical transmitters 106, 112, optical receivers 110, 116, or optical transceivers 118, 120 in FIG. 1 or each of the optical transmitters, receivers, or transceivers 208 of FIG. 2. However, the unit cells 304 may be used in any other suitable optical device or other device and in any other suitable system.

Figure 4:
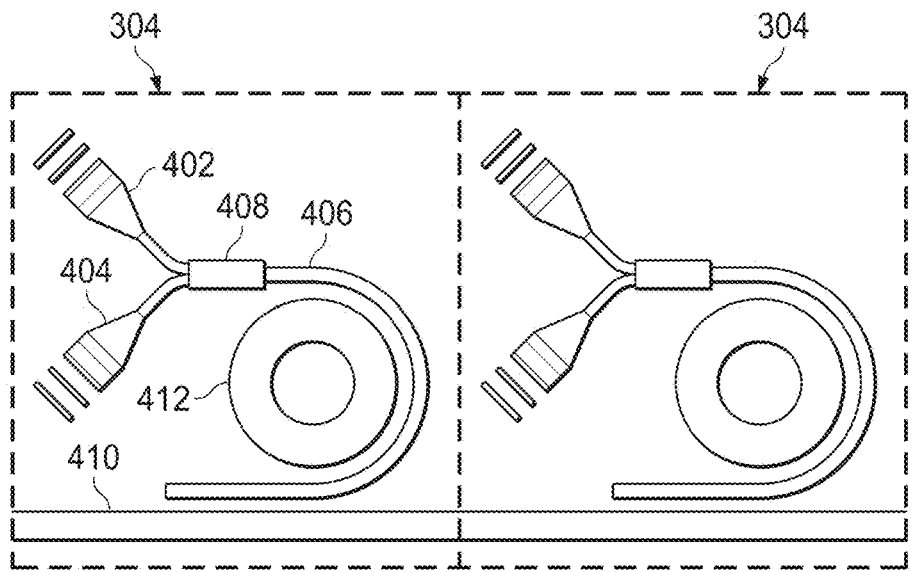
FIGS. 4 through 7 illustrate example independent unit cells having multi-polarization sensitivity in a photonic integrated circuit-based optical device according to this disclosure.

As shown in FIG. 4, each unit cell 304 includes multiple antenna elements 402 and 404. Each of the antenna elements 402 and 404 is configured to physically transmit and/or receive one or more optical signals to or from one or more external devices or systems. For example, each antenna element 402 and 404 may represent a nanophotonic antenna or other antenna element that transmits and/or receives at least one optical signal, along with one or more lenses or other optical devices configured to focus or otherwise process the at least one optical signal. Each antenna element 402 and 404 may have any suitable size, shape, and dimensions. In some cases, the emitting/receiving surface of each antenna element 402 and 404 may be about 3 μm to about 4 μm in diameter.

As can be seen in FIG. 4, the antenna elements 402 and 404 of each unit cell 304 are arranged substantially orthogonally to one another, which means that the antenna element 402 is rotated substantially 90° with respect to the antenna element 404. This enables the antenna elements 402 and 404 to collectively transmit and/or receive optical signals having different polarizations, such as P polarization and S polarization, depending on the relative rotations of the transmitting and receiving devices. This helps to provide multi-polarization sensitivity in the optical phased array 302.

In this example, each unit cell 304 supports coherent combination of polarized signals, and the antenna elements 402 and 404 are optically connected to a common signal pathway 406. The signal pathway 406 is configured to transport optical signals to and/or from the antenna elements 402 and 404. For example, the signal pathway 406 can transport optical signals to the antenna elements 402 and 404 for transmission. Also or alternatively, the signal pathway 406 can transport optical signals received by the antenna elements 402 and 404 to other components for processing. The signal pathway 406 includes any suitable structure configured to transport optical signals, such as an optical waveguide. To support coherent combination of polarized signals here, the signal pathway 406 is coupled to a "Y" splitter/combiner 408. The splitter/combiner 408 can split an optical signal from the signal pathway 406 into multiple optical signals that are provided to the antenna elements 402 and 404 for transmission. The splitter/combiner 408 can also or alternatively combine multiple optical signals received by the antenna elements 402 and 404 into a combined optical signal that is provided to the signal pathway 406.

In some embodiments, the signal pathway 406 of each unit cell 304 can interact with an optical bus 410, which can be optically coupled to multiple unit cells 304 (such as a row of unit cells 304). For example, the optical bus 410 may be used to provide an optical signal received via the feed network 308 to the unit cells 304 for transmission. The optical bus 410 may also or alternatively be used to provide optical signals received by the unit cells 304 to the feed network 308. The optical bus 410 includes any suitable structure configured to transport optical signals to and/or from multiple unit cells 304, such as an optical waveguide. Splitters/combiners or other structures may be used to split optical signals from the optical bus 410 for transmission over the signal pathways 406 and/or to combine signals from the signal pathways 406 for transmission over the optical bus 410.

Each unit cell 304 also includes a modulator 412 that is used (among other things) to control the phases of optical signals transmitted and/or received by the associated antenna elements 402 and 404. For example, when the antenna elements 402 and 404 are transmitting, the modulator 412 can be used to achieve a desired phase of outgoing optical signals in order to perform beam forming or beam steering. When the antenna elements 402 and 404 are receiving, the modulator 412 can be used to apply phase control to the incoming wavefront of received optical signals in order to decompose or reconstruct the wavefront. The modulator 412 includes any suitable structure configured to modulate the phase of an optical signal, such as a resonant micro-ring modulator or a PN junction micro-ring modulator. In some cases, each modulator 412 may be a resonant micro-ring modulator that is about 6 μm in diameter, although modulators of other sizes may be used here.

Each unit cell 304 shown here may have any suitable size, shape, and dimensions. In some embodiments, each unit cell 304 is substantially square in shape and has dimensions of about 12 μm by about 12 μm. However, the overall size, shape, and dimensions of each unit cell 304 can vary based on various factors, such as the size, shape, dimensions, and arrangement of its individual components.

Note that the path lengths associated with the separate antenna elements 402 and 404 in each unit cell 304 can be closely matched to one another. In some cases, the path lengths can be matched at the sub-wavelength level. Along with correlated S and P polarization control that can be achieved using the common modulator 412, this allows for coherent recombination of optical signals (such as when light at the TE0 or TM0 waveguide mode is used).

Figure 5:
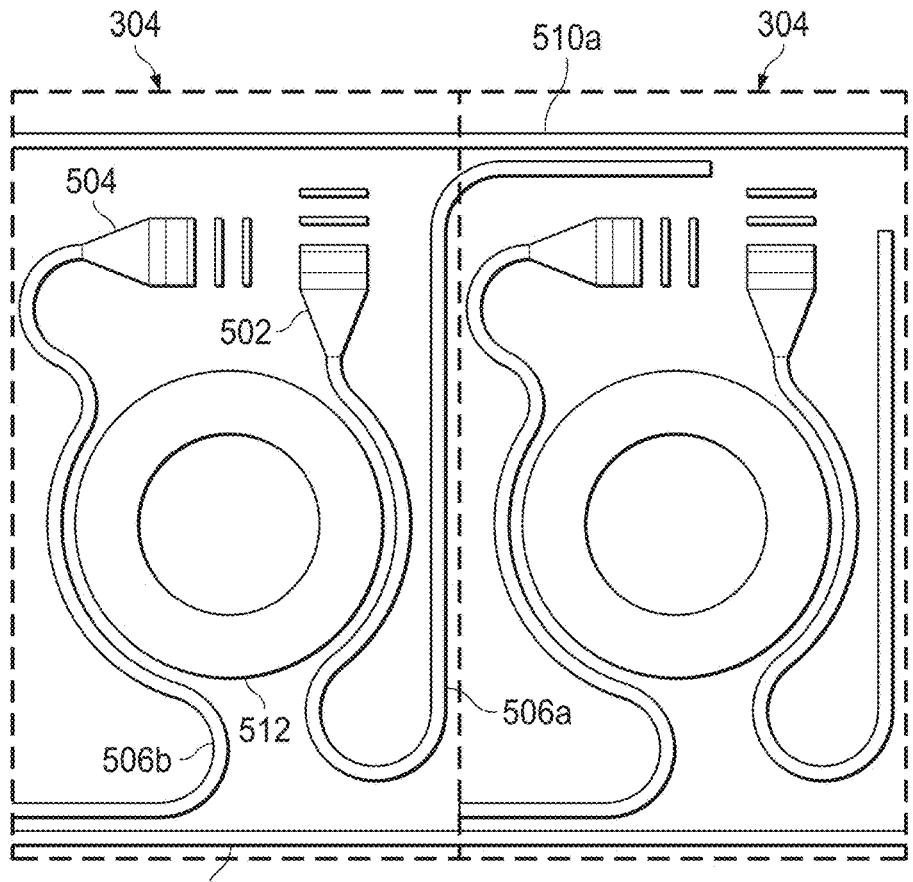

As shown in FIG. 5, each unit cell 304 includes multiple antenna elements 502 and 504, which may be the same as or similar to the antenna elements 402 and 404 described above. In this example, each unit cell 304 supports separate processing of light having different polarizations (such as S and P polarizations) using different antenna elements 502 and 504. As a result, the antenna elements 502 and 504 in each unit cell 304 are connected to separate signal pathways 506a-506b. Each signal pathway 506a-506b may be the same as or similar to the signal pathway 406 described above. Also, in this example, the signal pathways 506a-506b of each unit cell 304 can interact with separate optical buses 510a-510b, such as one optical bus for transporting light having P polarization and one optical bus for transporting light having S polarization. Each optical bus 510a-510b may be the same as or similar to the optical bus 410 described above. Each unit cell 304 also includes a modulator 512 that is used (among other things) to control the phases of optical signals transmitted and/or received by the associated antenna elements 504 and 504. The modulator 512 may be the same as or similar to the modulator 412 described above.

Again, note that the path lengths associated with the separate antenna elements 502 and 504 in each unit cell 304 can be closely matched to one another, such as at the sub-wavelength level. Along with correlated S and P polarization control that can be achieved using the common modulator 512, this allows for separate polarization measurements of optical signals in the different paths. Each unit cell 304 shown here may also have any suitable size, shape, and dimensions.

Figure 6:
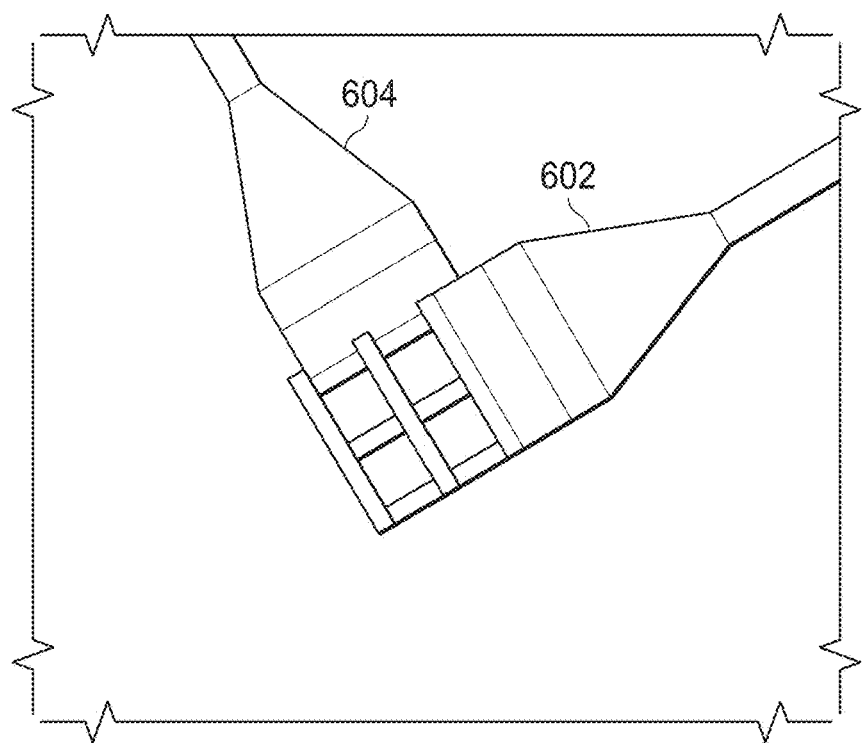
Figure 7:
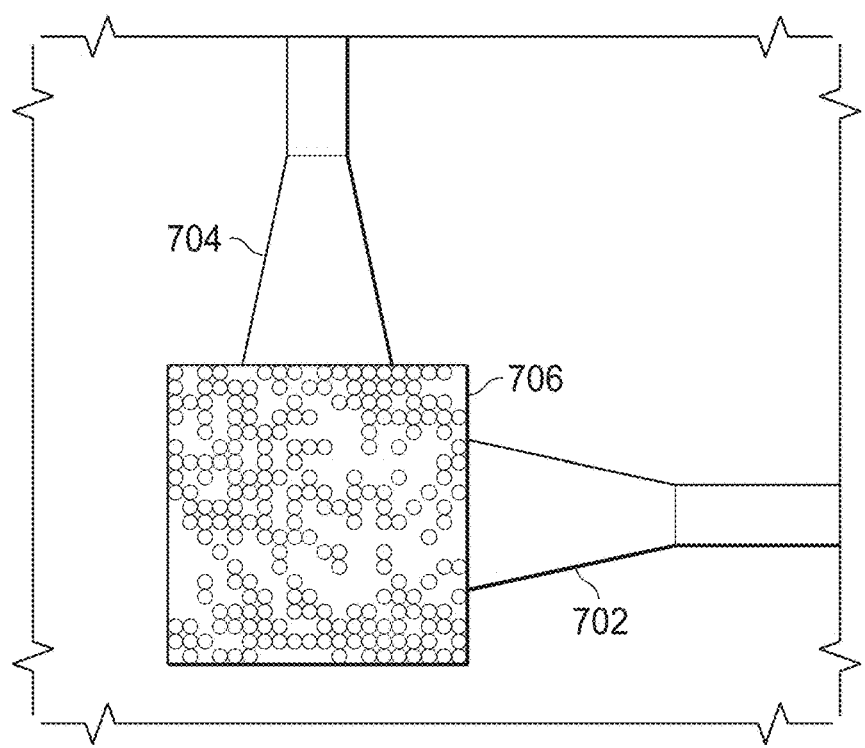

While the antenna elements in FIGS. 4 and 5 are spatially separated, it is also possible to have antenna elements that spatially overlap one another. One example of this is shown in FIG. 6, where antenna elements 602 and 604 overlap one another while still being positioned substantially orthogonal to one another. The antenna elements 602 and 604 here may be fed in any suitable manner, such as by using a common signal pathway as is done in FIG. 4 or using separate signal pathways as is done in FIG. 5. It is also possible to use a nano-antenna supporting multi-polarization functionality, one example of which is shown in FIG. 7. Here, a single antenna includes separate signal pathways 702 and 704 coupled to a dichroic splitter 706. The dichroic splitter 706 is configured to split illumination based on polarization so that signals associated with different polarizations are transmitted over different signal pathways 702 and 704.

Although FIGS. 4 through 7 illustrate examples of independent unit cells 304 having multi-polarization sensitivity in a photonic integrated circuit-based optical device, various changes may be made to FIGS. 4 through 7. For example, the sizes, shapes, and dimensions of each unit cell 304 and its individual components can vary as needed or desired. Also, the various signal paths, antenna elements, and buses shown here can easily vary based on a number of factors, such as the available space for routing optical signals to or from the unit cells 304. In addition, any other suitable modulation control approach may be used with the modulators of the unit cells 304.

Figure 8:
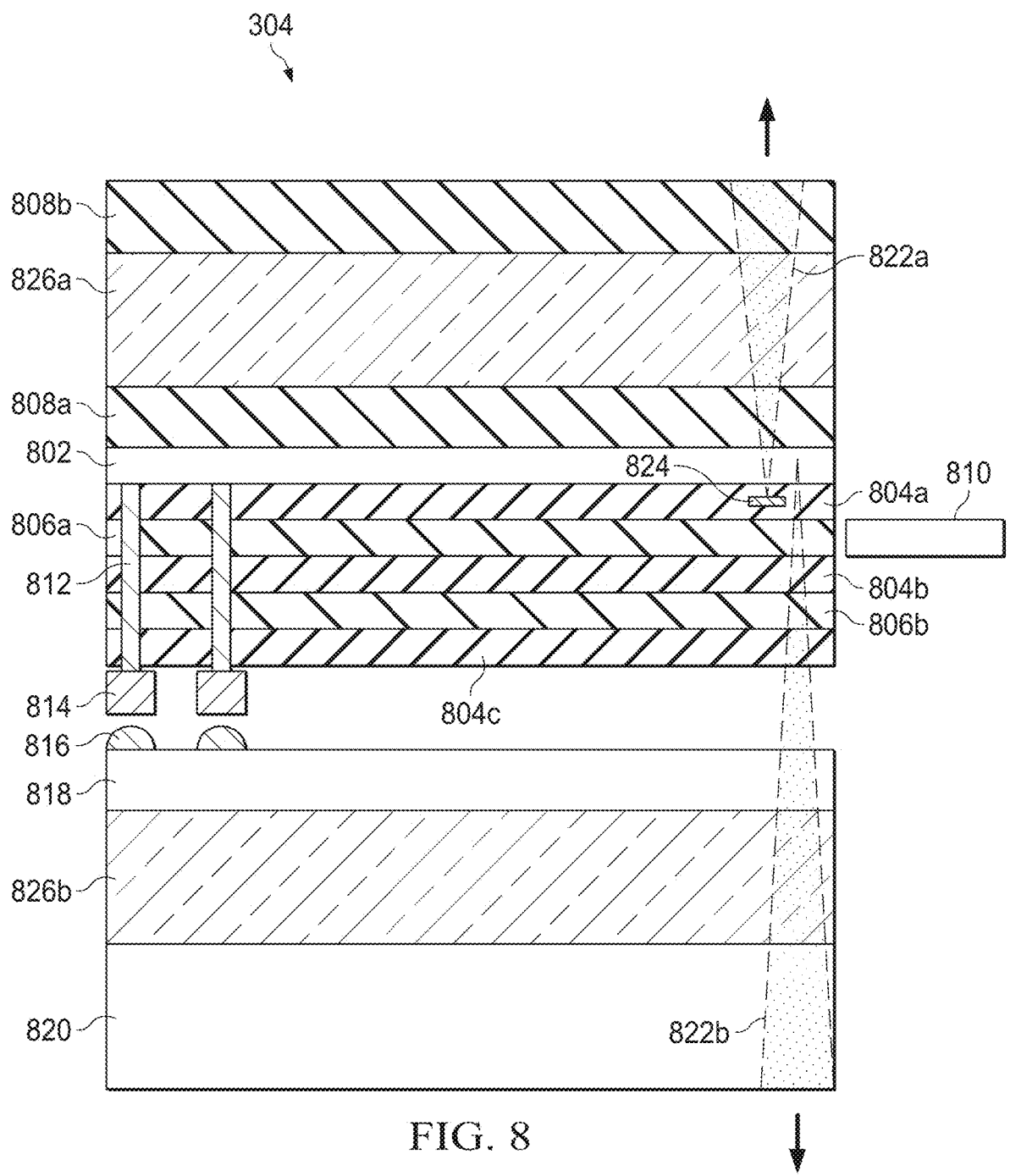
FIGS. 8 and 9 illustrate example cross-sections of independent unit cells having multi-polarization sensitivity in a photonic integrated circuit-based optical device according to this disclosure.
Figure 9:
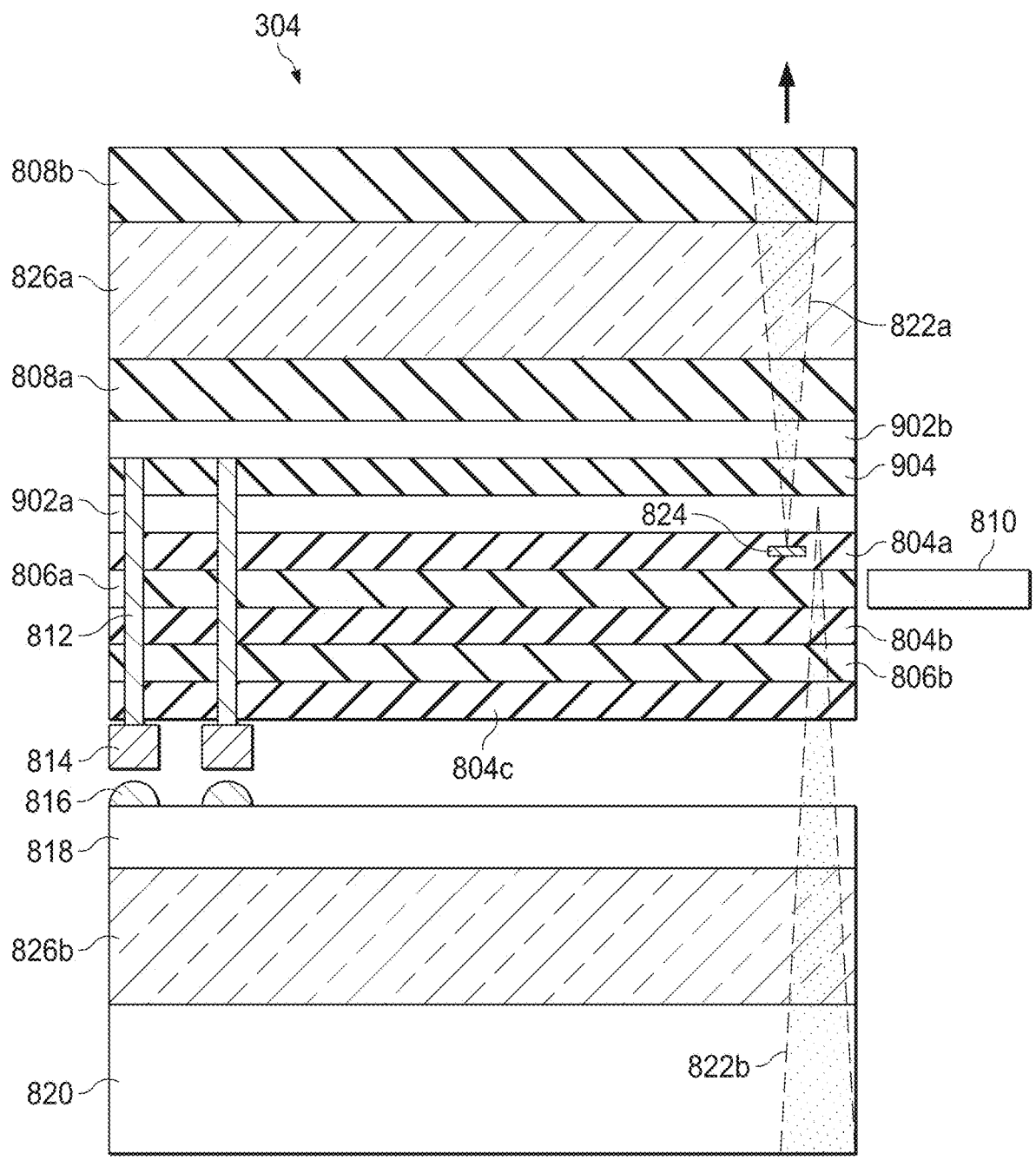

FIGS. 8 and 9 illustrate example cross-sections of independent unit cells 304 having multi-polarization sensitivity in a photonic integrated circuit-based optical device according to this disclosure. For ease of explanation, the unit cells 304 of FIGS. 8 and 9 may be described as being used in the optical device 300 in order to at least partially implement each of the optical transmitters 106, 112, optical receivers 110, 116, or optical transceivers 118, 120 in FIG. 1 or each of the optical transmitters, receivers, or transceivers 208 of FIG. 2. However, the unit cells 304 may be used in any other suitable optical device or other device and in any other suitable system.

As shown in FIG. 8, each unit cell 304 may be fabricated as a multi-layer structure that uses components in various layers to implement the desired functions of the unit cell 304. In this example, the multi-layer structure includes a photonics layer 802, which represents the layer in which various photonic functions (such as waveguides and possibly antennas) can be fabricated. The photonics layer 802 may be formed using any suitable material(s), such as silicon. The photonics layer 802 may also be formed in any suitable manner, such as by depositing material(s) on another layer and etching or otherwise processing the material(s). In addition, the photonics layer 802 may have any suitable dimensions, such as a thickness of about 220 nm.

Various layers 804a-804c and 806a-806b are positioned on one side of the photonics layer 802 and can provide electrical insulation or perform other functions. Each of the layers 804a-804c and 806a-806b may be formed using any suitable material(s). In some embodiments, each of the layers 804a-804c may be formed using silicon dioxide or other dielectric material, and each of the layers 806a-806b may be formed using silicon nitride. Each of the layers 804a-804c and 806a-806b may also be formed in any suitable manner, such as by depositing material(s) on another layer and etching or otherwise processing the material(s). In addition, each of the layers 804a-804c and 806a-806b may have any suitable dimensions. In some embodiments, the layer 804a may have a thickness of about 100 nm to about 1000 nm, each of the layers 804b-804c may have a thickness of about 100 nm, and each of the layers 806a-806b may have a thickness of about 220 nm.

Various layers 808a-808b are also positioned on the opposite side of the photonics layer 802 and can provide electrical insulation or perform other functions. Each of the layers 808a-808b may be formed using any suitable material(s). In some embodiments, each of the layers 808a-808b may be formed using silicon dioxide or other dielectric material. As a particular example, the layer 808a may represent a buried oxide (BOX) layer, and the layer 808b may represent an optional cap. Each of the layers 808a-808b may also be formed in any suitable manner, such as by depositing material(s) on another layer and etching or otherwise processing the material(s). In addition, each of the layers 808a-808b may have any suitable dimensions. In some embodiments, the layer 808a may have a thickness of about 1000 nm.

Depending on the implementation, one or more antenna elements of the unit cell 304 may be fabricated in the photonics layer 802 or in one or more of the layers 806a-806b. In this example, it is assumed that the one or more antenna elements of the unit cell 304 are fabricated in the photonics layer 802. Optical signals are provided to and/or received from the unit cell 304 using an optical fiber 810, which may represent an optical waveguide or other suitable structure. Electrical signals used by the unit cell 304 (such as signals for controlling the modulator of the unit cell 304) are provided to the unit cell 304 using one or more conductive vias 812. The one or more conductive vias 812 are electrically coupled to conductive pads 814, which may contact one or more solder bumps 816 (such as indium solder bumps) carried by an interposer layer 818. The layers 804c and 818 can be separated from one another by any suitable distance to accommodate the conductive pads 814, solder bumps 816, or other components, such as a distance of about 1110 nm. Note, however, that any other suitable mechanisms may be used to transport optical and electrical signals to and from the unit cell 304.

A carrier layer 820 represents a substrate or other layer of material that is used to carry the unit cell 304. The carrier layer 820 may be formed using any suitable material(s), such as silicon. The carrier layer 820 may also be formed in any suitable manner. In addition, the carrier layer 820 may have any suitable dimensions, such as a thickness of about 775 μm or more.

As shown in this particular example, the unit cell 304 may be configured to transmit and/or receive optical signals 822a in one direction or to transmit and/or receive optical signals 822b in the opposite direction. The direction of transmission and/or reception can be controlled based on whether a reflector 824 is included in the layer 804a (or another layer of the stack). Without the reflector 824, the photonics layer 802 may transmit and/or receive the optical signals 822b. With the reflector 824, the photonics layer 802 may transmit and/or receive the optical signals 822a (with or without using the optical signals 822b). The reflector 824 may be formed using any suitable reflective material(s), such as one or more metals. The reflector 824 may also be formed in any suitable manner, such as by depositing material(s) on another layer and etching or otherwise processing the material(s). In addition, the reflector 824 may have any suitable dimensions, such as a length of about 100 nm to about 300 nm.

One or more birefringent layers 826a-826b may optionally be used to spatially separate light of different polarizations. This may be useful, for example, in embodiments where spatially-separated antenna elements 402-404, 502-504 are used to transmit and/or receive light of different polarizations. Note that while two birefringent layers 826a-826b are shown here, a single birefringent layers 826a or 826b may be used depending on which optical signals 822a or 822b are being transmitted and/or received by the unit cell 304. Each birefringent layer 826a-826b may be formed using any suitable material(s). Each birefringent layer 826a-826b may also be formed in any suitable manner, such as by depositing material(s) on another layer and etching or otherwise processing the material(s). In addition, each birefringent layer 826a-826b may have any suitable dimensions. Note that while birefringent layers are shown here, other birefringent structures may be used. For instance, microlenses or other lenses used with the antenna elements of the unit cell 304 may be formed using one or more birefringent materials.

The unit cell 304 shown in FIG. 9 contains many of the same layers as the unit cell 304 shown in FIG. 8. However, in FIG. 9, there are two photonics layers 902a-902b instead of one, and the photonics layers 902a-902b are separated by a layer 904. In some cases, different antenna elements of the unit cell 304, such as the antenna elements 602 and 604, may be implemented in different photonics layers 902a-902b. The layer 904 may represent a layer of silicon dioxide or other dielectric material, and the layer 904 may have any suitable dimensions, such as a thickness of about 100 nm to about 1000 nm.

Although FIGS. 8 and 9 illustrate examples of cross-sections of independent unit cells 304 having multi-polarization sensitivity in a photonic integrated circuit-based optical device, various changes may be made to FIGS. 8 and 9. For example, various layers in the unit cells 304 may be combined, further subdivided, replicated, omitted, or rearranged and additional layers may be added according to particular needs. In general, any of the unit cells 304 described in this disclosure may be implemented in any suitable manner using any suitable layers of material. Also, the specific materials and dimensions of the various layers described above are for illustration only and can vary as needed or desired.

Depending on the implementation, transmission and reception of optical signals may occur through a single shared aperture (such as when one or more optical phased arrays 302 have a common aperture) or through separate apertures (such as when multiple optical phased arrays 302 have different apertures). When a single shared aperture is used, the transmit and receive wavelengths can be separated by a suitable amount in order to allow concurrent transmission and reception of optical signals. For example, the transmit and receive wavelengths can be separated by the free spectral range of the modulators 412, 512 used in the unit cells 304 of the optical phased array 302, which can help to reduce or minimize transmit backscatter into the receiver's detector. In some cases, a 40 nm separation between the transmit and receive wavelengths may be adequate. However, other suitable separations between the transmit and receive wavelengths may be used depending on, among other things, the design of the modulators 412, 512 in the unit cells 304. For instance, the free spectral range of the modulators 412, 512 (and therefore the separation between the transmit and receive wavelengths) can vary based on a number of factors, such as the spacing or diameter of the modulators 412, 512 or the index of refraction of the material(s) forming the modulators 412, 512. Wavelength separation can also be supported in other ways, such as by using on-chip Bragg gratings.

Note that the ability to change the phases of optical signals using the modulators 412, 512 in the unit cells 304 of the optical phased array 302 may support other functions in addition to the beam forming, beam steering, or wavefront reconstruction operations mentioned above. For example, atmospheric phase distortions are known to affect optical transmissions. Various mechanisms are known for measuring atmospheric phase distortions, and these measured phase distortions may be used to adjust the phases provided by the modulators 412, 512. For instance, the phase shifts provided by the modulators 412, 512 may be adjusted to provide corrections to the measured atmospheric phase distortions. Other types of adaptive corrections may also be made by adjusting the phases of the modulators 412, 512, such as tip/tilt correction. Effectively, the modulators 412, 512 in the optical phased array 302 can be used to provide an adaptive optic function. In some embodiments, the adaptive optic function can be used to compensate for both spatial and depolarization effects.

Also note that, as described above, the modulators 412, 512 may be implemented in various ways. In some embodiments, optical phase shifts occur in each of the unit cells 304 by (i) changing the index of refraction of a waveguide carrying an optical signal or (ii) changing the charge carrier density of a waveguide carrying an optical signal. The first approach may be achieved using thermal resonators, and the second approach may be achieved using PN junction micro-ring modulators. One possible advantage of PN junction micro-ring modulators over thermal resonators is power consumption, since PN junction micro-ring modulators may consume very small amounts of power (such as less than 10 μW each).

Figure 10:
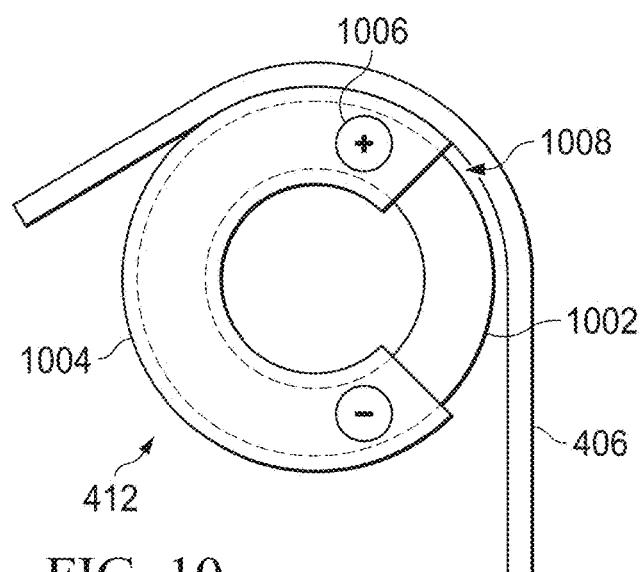
FIGS. 10 and 11 illustrate example modulators for use in unit cells of a photonic integrated circuit-based optical device according to this disclosure.
Figure 11:
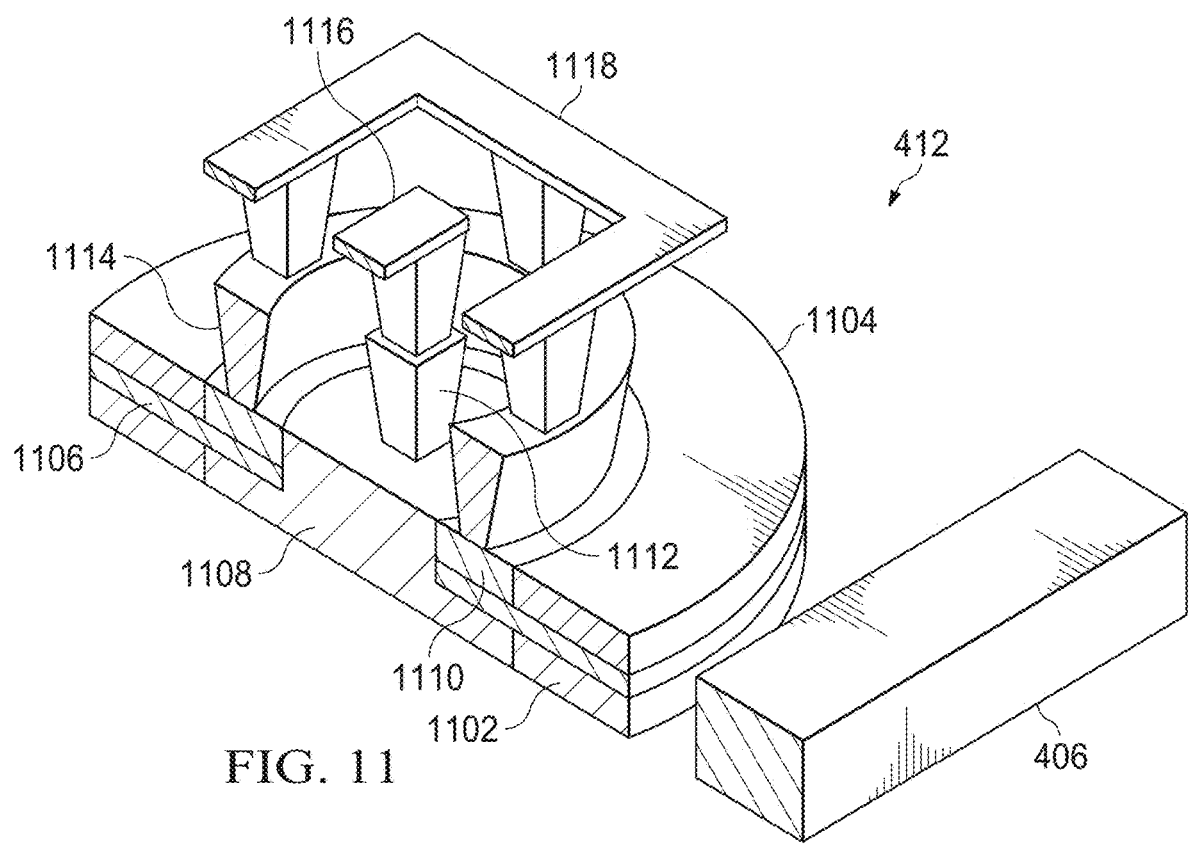

FIGS. 10 and 11 illustrate example modulators 412 in unit cells 304 of an optical phased array 302 according to this disclosure. Note that similar designs may be used for the modulators in other implementations of the unit cells 304 described above, such as the modulators 512. As shown in FIG. 10, the modulator 412 here represents a thermal resonator that is implemented using a micro-ring resonator 1002 and a heater 1004 positioned above or otherwise near the micro-ring resonator 1002. The micro-ring resonator 1002 resonates based on an optical signal flowing through the associated signal pathway 406. Varying the temperature of the micro-ring resonator 1002 alters the resonance wavelength of the micro-ring resonator 1002, thereby changing the phase of the optical signal flowing through the signal pathway 406. Voltages can be applied to two electrical contacts 1006 of the heater 1004 in order to create the desired temperature change and therefore implement the desired phase shift of the optical signal flowing through the signal pathway 406. Different voltages applied to the heater 1004 can cause different phase shifts to occur in the modulator 412.

The micro-ring resonator 1002 may be formed from any suitable material(s), such as silicon, and in any suitable manner. The heater 1004 may be formed from any suitable material(s), such as one or more metals, and in any suitable manner. The micro-ring resonator 1002 may be separated from the heater 1004 by any suitable material(s), such as silicon dioxide. The micro-ring resonator 1002 and heater 1004 may each have any suitable size, shape, and dimensions. In some embodiments, the micro-ring resonator 1002 is annular and has a diameter of about 6 μm, and the heater 1004 is crescent-shaped and has a diameter of about 6 μm. However, other shapes and sizes may be used here. A gap 1008 between the micro-ring resonator 1002 and the signal pathway 406 may have any suitable value, such as about 150 nm to about 210 nm (±10 nm). In some cases, design parameters like the thickness of the micro-ring resonator 1002 and/or the size of the gap 1008 can be altered in order to provide desired functionality for the modulator 412.

As shown in FIG. 11, the modulator 412 here represents a PN junction micro-ring modulator that is implemented using various regions of semiconductor material, such as doped and undoped silicon. In this example, the modulator 412 is shown in cross-section for explanation. Here, the modulator 412 includes a first annular semiconductor region 1102 separated from a second annular semiconductor region 1104. The annular semiconductor regions 1102 and 1104 can represent different types of semiconductor material, such as when the annular semiconductor region 1102 represents an N-type semiconductor material and the annular semiconductor region 1104 represents a P-type semiconductor material. A semiconductor region 1106 (such as undoped silicon) can separate the regions 1102-1104. A doped semiconductor region 1108 is positioned within the annular regions 1102-1104, and a doped semiconductor region 1110 is positioned around an upper portion of the doped semiconductor region 1108. The doped semiconductor regions 1108 and 1110 can represent different regions of semiconductor material with different dopants, such as when the doped semiconductor region 1108 is doped with an N+ dopant and the doped semiconductor region 1110 is doped with a P+ dopant. An electrical contact 1112 can be used to form an electrical connection with the doped semiconductor region 1108, and an electrical contact 1114 can be used to form an electrical connection with the doped semiconductor region 1110. An electrical connection 1116 can be used to provide a voltage to the electrical contact 1112, and an electrical connection 1118 can be used to provide a voltage to the electrical contact 1114.

Here, the various semiconductor regions 1102-1110 form a PN junction micro-ring modulator, and the electrical contacts 1112, 1114 and electrical connections 1116, 1118 allow voltages to be applied that alter the charge carrier density of the PN junction micro-ring modulator. This alters the phase of an optical signal flowing through the associated signal pathway 406. Voltages applied to the electrical connections 1116, 1118 can provide the desired voltage difference and therefore implement the desired phase shift of the optical signal flowing through the signal pathway 406. Different voltages applied to the electrical connections 1116, 1118 can cause different phase shifts to occur in the modulator 412.

Although FIGS. 10 and 11 illustrate examples of modulators 412 in unit cells 304 of an optical phased array 302, various changes may be made to FIGS. 10 and 11. For example, the actual structure of a thermal resonator or PN junction micro-ring modulator can vary as needed or desired. Also, any other suitable structure may be used to phase-modulate an optical signal in each unit cell 304.

Figure 12:
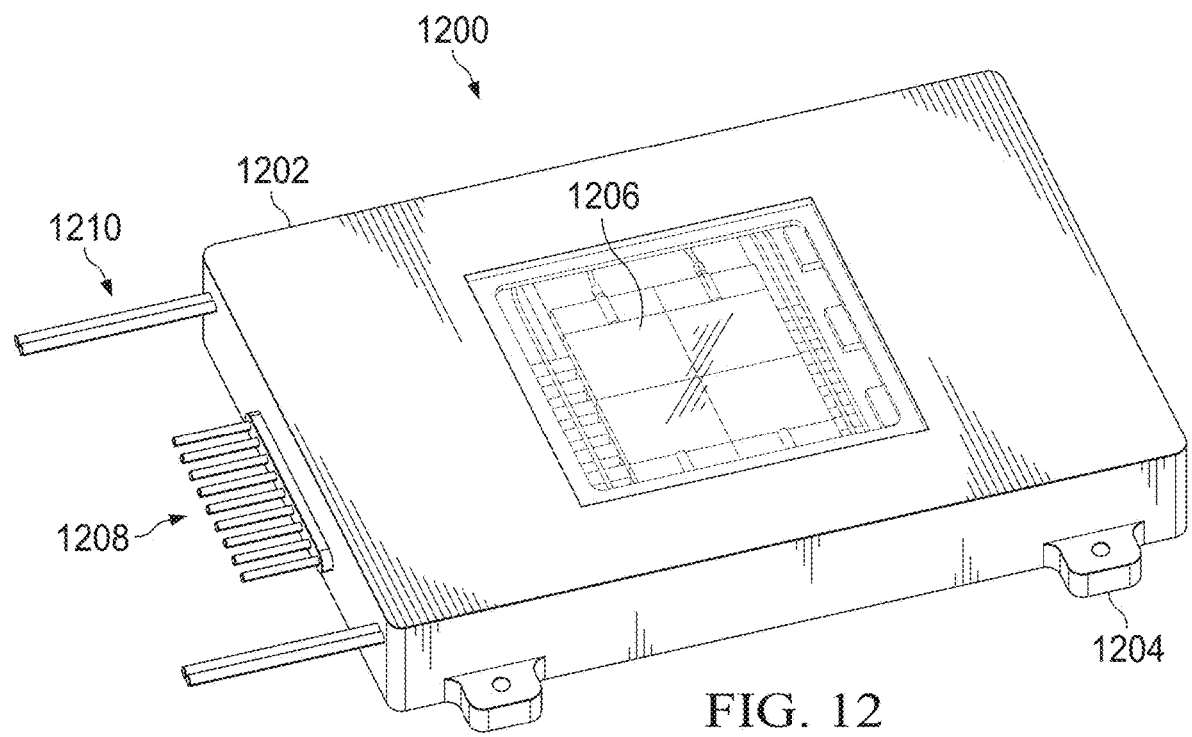
FIGS. 12 through 14 illustrate a specific example photonic integrated circuit-based optical device according to this disclosure.
Figure 13:
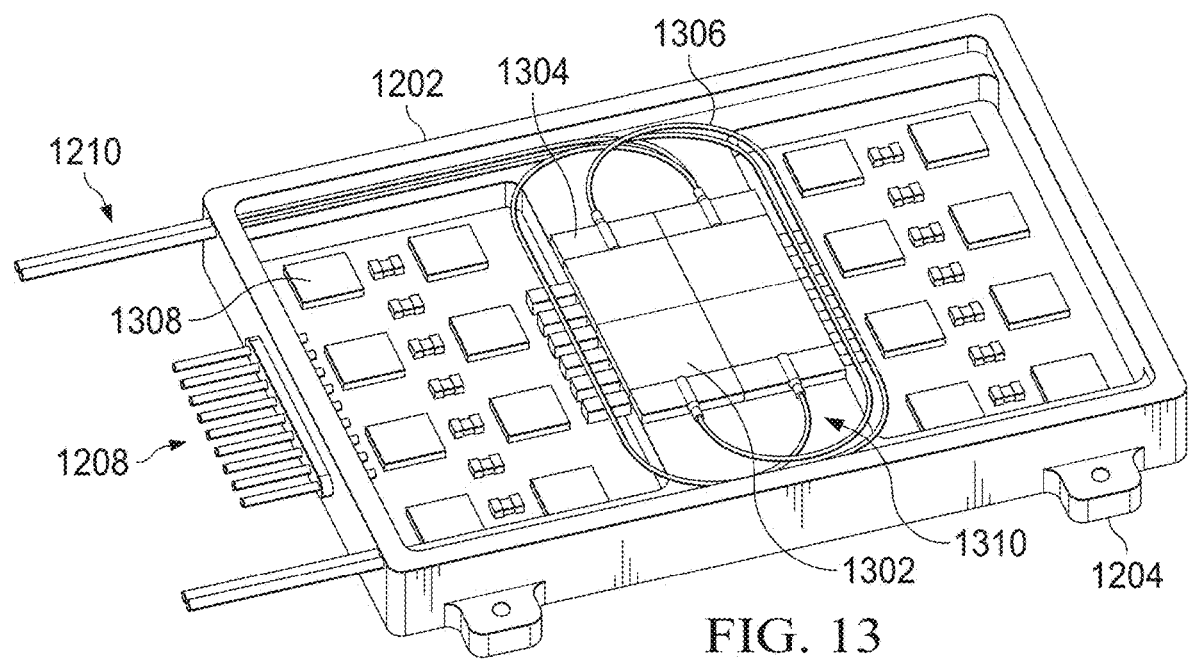
Figure 14:
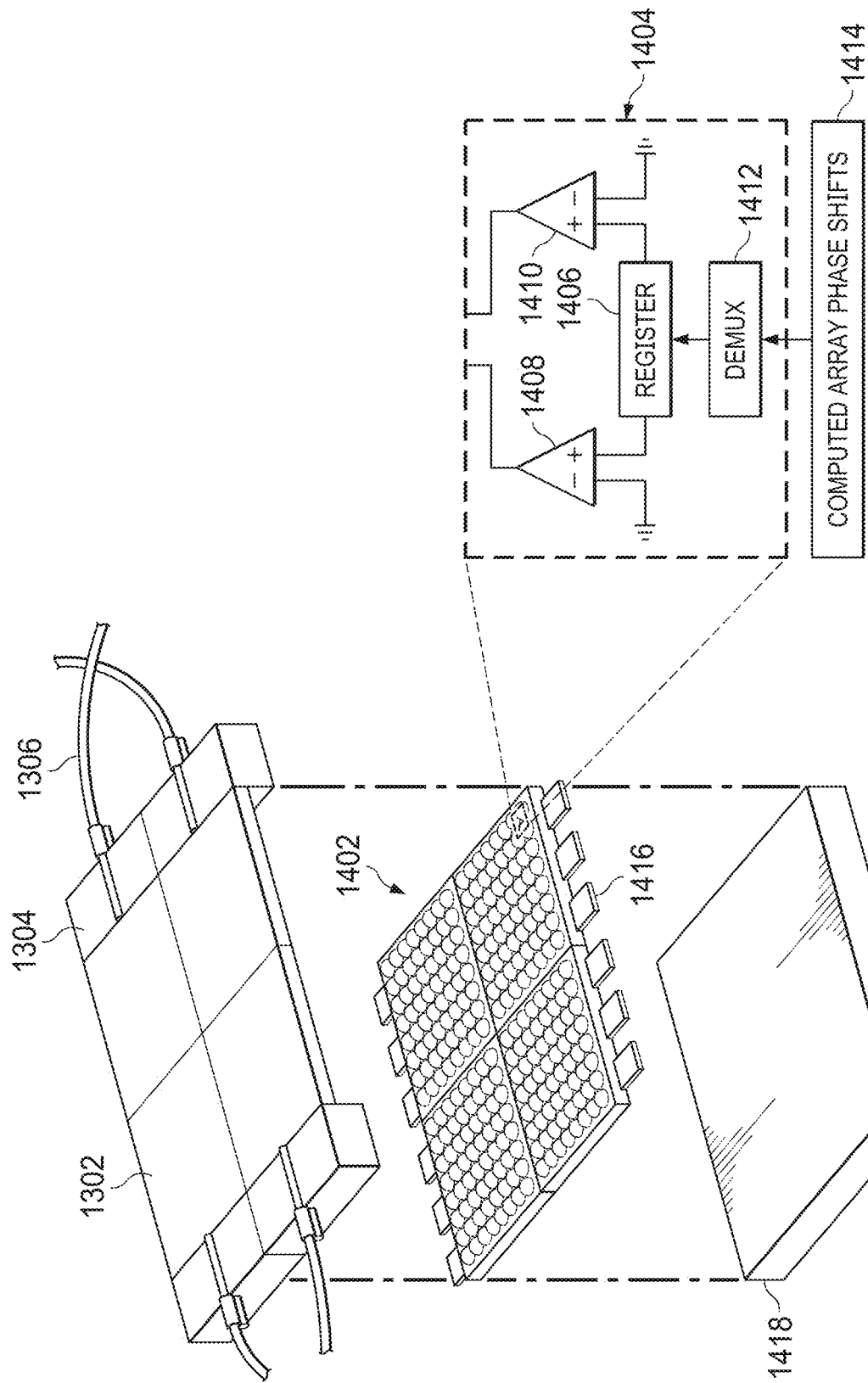

FIGS. 12 through 14 illustrate a specific example photonic integrated circuit-based optical device 1200 according to this disclosure. The optical device 1200 here may represent a specific implementation of the device 300 described above. As shown in FIG. 12, the optical device 1200 includes a package 1202, which surrounds and protects electronic and optical components of an optical transmitter, optical receiver, or optical transceiver. For example, the package 1202 may encase and form a hermetic seal around the electronic and optical components. The package 1202 may be formed from any suitable material(s), such as one or more metals, and in any suitable manner. In some embodiments, the package 1202 is formed using a nickel-cobalt or nickel-iron alloy (such as KOVAR) or other material that has a coefficient of thermal expansion closely matched to that of borosilicate or other glass. The package 1202 may also have any suitable size, shape, and dimensions. In some cases, the package 1202 may be formed in multiple parts that can be bonded, sealed, or otherwise coupled together to enclose the electronic and optical components. For example, the package 1202 may be formed using a larger lower portion and an upper cover such that the electronic and optical components can be inserted into the lower portion and the upper cover can be connected to the lower portion. Also, in some cases, the package 1202 may include flanges 1204 that support mounting of the package 1202 to a larger structure. However, the package 1202 may have any other suitable form.

The package 1202 includes an optical window 1206, which is substantially or completely transparent optically (at least with respect to the optical signals being transmitted from or received by the optical device 1200). The optical window 1206 may be formed from any suitable material(s), such as borosilicate glass or other glass, and in any suitable manner. The optical window 1206 may also have any suitable size, shape, and dimensions. In some cases, the optical window 1206 may also function as a bandpass or other optical filter that filters the wavelength(s) of the optical signals being transmitted from or received by the optical device 1200.

The package 1202 may also include one or more electrical feedthroughs 1208, which represent one or more electrical connections that can be used to transport one or more electrical signals between the interior and the exterior of the package 1202. The one or more electrical signals may be used here for any suitable purposes, such as to control one or more operations of the optical device 1200. As a particular example, the one or more electrical signals may be used for controlling the phases of antenna elements of a photonic integrated circuit in the optical device 1200. In addition, the package 1202 may include one or more fiber inputs/outputs 1210, which can be used to provide one or more input signals to the optical device 1200 and/or receive one or more output signals from the optical device 1200. The one or more input signals may carry information to be transmitted from the optical device 1200. The one or more output signals may carry information received at and recovered by the optical device 1200. In this example, there are two fiber inputs/outputs 1210, although the optical device 1200 may include a single fiber input/output 1210 or more than two fiber inputs/outputs 1210. Note, however, that no fiber inputs/outputs 1210 may be needed if all optical generation and processing occurs using components within the package 1202, in which case the electrical feedthroughs 1208 may be used to transport information to or from the optical device 1200.

As shown in FIG. 13, a photonic integrated circuit 1302 is positioned within the package 1202, namely at a location where the photonic integrated circuit 1302 can transmit and/or receive optical signals through the optical window 1206. The photonic integrated circuit 1302 may, for example, represent the PIC-based optical phased array 302 described above and may include unit cells 304 having any of the various forms described above. The photonic integrated circuit 1302 can be used to support optical transmission and/or optical reception, depending on the design of the photonic integrated circuit 1302. The photonic integrated circuit 1302 may also support a number of additional optical functions as needed or desired. The photonic integrated circuit 1302 may be formed from any suitable material(s), such as silicon, indium phosphide, or gallium arsenide, and in any suitable manner. The photonic integrated circuit 1302 may also have any suitable size, shape, and dimensions. As a particular example, the photonic integrated circuit 1302 may be square and have an edge length of about 40 mm, although any other suitable sizes and shapes may be used here.

Fiber mounts 1304 are used to couple to optical fibers 1306 at locations where the optical fibers 1306 can provide optical signals to and/or receive optical signals from the photonic integrated circuit 1302. For example, the optical fibers 1306 may provide optical signals from a source laser to the photonic integrated circuit 1302 for use during outgoing transmissions. The optical fibers 1306 may also or alternatively provide optical signals received by the photonic integrated circuit 1302 to a receiver for processing. Each fiber mount 1304 includes any suitable structure configured to be coupled to an optical fiber 1306. Each optical fiber 1306 represents any suitable length of an optical medium configured to transport optical signals to or from a photonic integrated circuit 1302. Note that while four fiber mounts 1304 and optical fibers 1306 are shown here, the optical device 1200 may include, one, two, three, or more than four fiber mounts 1304 and optical fibers 1306. Also note that no fiber mounts 1304 and optical fibers 1306 may be needed if all optical generation and processing occurs using components of the photonic integrated circuit 1302.

An electronic control board 1308 includes electronic components, such as one or more integrated circuit chips and other components, that control the operation of the photonic integrated circuit 1302. For example, the electronic control board 1308 may include one or more components that calculate desired phases for optical signals to be generated by antenna elements of the photonic integrated circuit 1302, which allows the electronic control board 1308 to control beam forming or beam steering operations. Also or alternatively, the electronic control board 1308 may include one or more components that calculate desired phases to be applied to optical signals received by antenna elements of the photonic integrated circuit 1302, which allows the electronic control board 1308 to control wavefront reconstruction operations. These decisions can be used to adjust the modulators 412, 512 within the unit cells 304 of the photonic integrated circuit 1302. The electronic control board 1308 includes any suitable components configured to perform one or more desired functions related to a photonic integrated circuit 1302. Spacers 1310 may be positioned on opposite sides of the photonic integrated circuit 1302 and used to help separate the optical fibers 1306 from the electronic control board 1308. The spacers 1310 may be formed from any suitable material(s), such as ceramic, and in any suitable manner.

As shown in FIG. 14, the photonic integrated circuit 1302 is electrically coupled to a digital read in integrated circuit (DRIIC) layer 1402, which is used to provide electrical signals to the modulators 412, 512 in the unit cells 304 of the photonic integrated circuit 1302 in order to control the phase modulations applied to the incoming or outgoing optical signals by the modulators 412, 512. In some embodiments, the photonic integrated circuit 1302 can be "flip-chip" bonded to the DRIIC layer 1402, although other mechanisms for electrically coupling the photonic integrated circuit 1302 and the DRIIC layer 1402 may be used.

The DRIIC layer 1402 in this example includes a number of individual DRIIC cells 1404, where each DRIIC cell 1404 may be associated with (and in some cases may have about the same size as) a corresponding one of the unit cells 304 in the photonic integrated circuit 1302. The DRIIC cells 1404 control the phase modulations that are applied by the modulators 412, 512 of the unit cells 304. The DRIIC cells 1404 may essentially function as digital-to-analog conversion devices, where digital programming (such as 2-bit, 8-bit, or other digital values) are converted into appropriately-scaled direct current (DC) analog voltages spanning a specific range of voltages. As a particular example, the DRIIC cells 1404 may operate to convert digital values into suitable DC analog voltages between 0 V and 12.3 V, although other voltages (including negative voltages) can be supported depending on the implementation.

In this example, each DRIIC cell 1404 may include a register 1406 configured to store values associated with different phase shifts to be applied by the modulator 412, 512 of its corresponding unit cell 304. To provide a desired phase shift, appropriate values from the register 1406 are selected and provided to two amplifiers 1408 and 1410, which generate output voltages that are provided to the associated modulator 412, 512. The output voltages control the phase shift provided by the associated modulator 412, 512. Different values from the register 1406 are provided to the amplifiers 1408 and 1410 over time so that different output voltages are applied to the associated modulator 412, 512. In this way, each DRIIC cell 1404 can cause its associated modulator 412, 512 to provide different phase shifts over time, thereby supporting various functions like beam forming, beam steering, or wavefront reconstruction. In some cases, the outputs of the amplifiers 1408 and 1410 can be coupled to the electrical contacts 1006 of a thermal resonator or to the electrical connections 1116 and 1118 of a PN junction modulator.

In some embodiments, each DRIIC cell 1404 may be used to provide a relatively small number of different output voltages to its associated modulator 412, 512. For example, in some cases, each DRIIC cell 1404 can cause the associated modulator 412, 512 to provide four different phase shifts. However, other numbers of output voltages and associated phase shifts may be supported here, such as when up to 256 different phase shifts or more are supported. Also, the output voltages provided to the modulators 412, 512 in different DRIIC cells 1404 may be different even when those modulators 412, 512 are providing the same phase shift, which may be due to factors such as manufacturing tolerances. The actual output voltages used for each modulator 412, 512 can be selected during calibration so that appropriate values may be stored in each register 1406.

In this example, the actual values in each DRIIC cell 1404 that are provided to the amplifiers 1408 and 1410 by the register 1406 over time can be controlled using a demultiplexer 1412. Each demultiplexer 1412 receives a stream of computed array phase shifts 1414 and outputs the phase shifts 1414 that are to be applied by that DRIIC cell's associated modulator 412, 512. The phase shifts 1414 output by the demultiplexer 1412 can identify or otherwise to be used to select specific values from the register 1406 to be output to the amplifiers 1408 and 1410. The computed array phase shifts 1414 here may be provided by one or more external components, such as the electronic control board 1308 or an external component communicating with the electronic control board 1308. While not shown here, array-level deserialization circuitry may be used to separate and fan out high-speed digital signals to the array of individual DRIIC cells 1404.

Each register 1406 includes any suitable structure configured to store and retrieve values. Each amplifier 1408 and 1410 includes any suitable structure configured to generate a control voltage or other control signal based on an input. Each demultiplexer 1412 includes any suitable structure configured to select and output values.

Note that this represents one example way in which the modulators 412, 512 of the unit cells 304 can be controlled. In general, any suitable technique may be used to provide suitable control voltages or other control signals to the modulators 412, 512 for use in controlling the phase shifts provided by the modulators 412, 512. For example, the approach shown in FIG. 14 allows values that are applied to the amplifiers 1408 and 1410 to be stored in the register 1406 and retrieved as needed, which allows an external component to provide indicators of the desired values to be retrieved to the DRIIC cells 1404. In other embodiments, an external component may provide digital values that are converted by different circuitry into analog values.

Various electrical connections 1416 are provided in or with the DRIIC layer 1402. The electrical connections 1416 may be used to provide electrical signals to the DRIIC cells 1404, such as when the electrical connections 1416 are used to receive high-speed digital signals containing the computed array phase shifts 1414 for the DRIIC cells 1404. Any suitable number and arrangement of electrical connections 1416 may be used here.

A thermal spreader 1418 can be positioned in thermal contact with the DRIIC layer 1402. The thermal spreader 1418 helps to provide a more consistent temperature across the DRIIC layer 1402 and the photonic integrated circuit 1302 by functioning as a heat sink that removes thermal energy from the DRIIC layer 1402 and the photonic integrated circuit 1302. At times, the thermal spreader 1418 may also provide thermal energy to the DRIIC layer 1402, which helps to heat the DRIIC layer 1402 and the photonic integrated circuit 1302. Thermal energy that is generated by the DRIIC layer 1402 and/or injected into the photonic integrated circuit 1302 may vary over time, and the thermal spreader 1418 can help to maintain a substantially constant temperature of the photonic integrated circuit 1302. The thermal spreader 1418 may be formed from any suitable material(s), such as one or more metals like copper, and in any suitable manner. The thermal spreader 1418 may also have any suitable size, shape, and dimensions.

Although FIGS. 12 through 14 illustrate one specific example of a photonic integrated circuit-based optical device 1200, various changes may be made to FIGS. 12 through 14. For example, one or more photonic integrated circuits may be packaged in any other suitable manner, arranged relative to other components in any other suitable manner, and coupled to other components in any other suitable manner. Also, any other suitable modulation control approach and any other suitable thermal management approach may be used with one or more photonic integrated circuits.

The following describes example embodiments of this disclosure that implement or relate to a photonic integrated circuit with independent unit cells having multi-polarization sensitivity. However, other embodiments may be used in accordance with the teachings of this disclosure.

In a first embodiment, an apparatus includes a photonic integrated circuit having an optical phased array, where the optical phased array includes multiple unit cells. Each unit cell includes (i) at least one antenna element configured to transmit or receive optical signals and (ii) a modulator configured to phase-shift the optical signals transmitted or received by the antenna element. Each unit cell is configured to transmit or receive light having multiple polarizations in the optical signals.

In a second embodiment, a method includes using an optical phased array of a photonic integrated circuit to transmit or receive optical signals, where the optical phased array includes multiple unit cells. Each unit cell includes (i) at least one antenna element configured to transmit or receive the optical signals and (ii) a modulator configured to phase-shift the optical signals transmitted or received by the antenna element. Each unit cell transmits or receives light having multiple polarizations in the optical signals.

Any single one or any suitable combination of the following features may be used with the first or second embodiment. Each unit cell may include multiple antenna elements arranged substantially orthogonally to each other such that the multiple antenna elements are configured to transmit or receive the light having the multiple polarizations. Each unit cell may further include a common signal pathway associated with the multiple antenna elements and be configured to coherently combine the light having the multiple polarizations. Each unit cell may further include separate signal pathways associated with the multiple antenna elements and be configured to separately process the light having different ones of the multiple polarizations. The modulator of each unit cell may be configured to provide correlated phase-shifts to the light having the multiple polarizations. Each unit cell may include multiple antenna elements that are spatially separated, and each unit cell may further include a birefringent material configured to spatially separate the light having different ones of the multiple polarizations. Each unit cell may include multiple antenna elements that spatially overlap one another. Each unit cell may include a multi-polarization antenna element. The modulator of each unit cell may include one of (i) a thermal resonator having a micro-ring resonator and a heater or (ii) a PN junction modulator. The optical phased array may include at least one million unit cells.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a photonic integrated circuit comprising an optical phased array, the optical phased array comprising multiple unit cells, each unit cell comprising (i) at least one antenna element configured to transmit or receive optical signals and (ii) a modulator configured to phase-shift the optical signals transmitted or received by the at least one antenna element;
wherein the at least one antenna element of each unit cell is configured to simultaneously transmit or simultaneously receive light having multiple polarizations in the optical signals.

2. The apparatus of claim 1, wherein each unit cell comprises multiple antenna elements arranged substantially orthogonally to each other such that the multiple antenna elements are configured to transmit or receive the light having the multiple polarizations.

3. The apparatus of claim 2, wherein each unit cell further comprises a common signal pathway associated with the multiple antenna elements and is configured to coherently combine the light having the multiple polarizations.

4. The apparatus of claim 2, wherein each unit cell further comprises separate signal pathways associated with the multiple antenna elements and is configured to separately process the light having different ones of the multiple polarizations.

5. The apparatus of claim 2, wherein the modulator of each unit cell is configured to provide correlated phase-shifts to the light having the multiple polarizations.

6. The apparatus of claim 1, wherein:
each unit cell comprises multiple antenna elements that are spatially separated; and
each unit cell further comprises a birefringent material configured to spatially separate the light having different ones of the multiple polarizations.

7. The apparatus of claim 1, wherein each unit cell comprises multiple antenna elements that spatially overlap one another.

8. The apparatus of claim 1, wherein each unit cell comprises a multi-polarization antenna element.

9. The apparatus of claim 1, wherein the modulator of each unit cell comprises one of:
a thermal resonator having a micro-ring resonator and a heater; and
a PN junction modulator.

10. The apparatus of claim 1, wherein the optical phased array includes at least one million unit cells.

11. A method comprising:
using an optical phased array of a photonic integrated circuit to transmit or receive optical signals, the optical phased array comprising multiple unit cells, each unit cell comprising (i) at least one antenna element configured to transmit or receive the optical signals and (ii) a modulator configured to phase-shift the optical signals transmitted or received by the at least one antenna element;
wherein the at least one antenna element of each unit cell simultaneously transmits or simultaneously receives light having multiple polarizations in the optical signals.

12. The method of claim 11, wherein each unit cell comprises multiple antenna elements arranged substantially orthogonally to each other such that the multiple antenna elements transmit or receive the light having the multiple polarizations.

13. The method of claim 12, wherein:
each unit cell further comprises a common signal pathway associated with the multiple antenna elements; and
the method further comprises coherently combining the light having the multiple polarizations.

14. The method of claim 12, wherein:
each unit cell further comprises separate signal pathways associated with the multiple antenna elements; and
the method further comprises separately processing the light having different ones of the multiple polarizations.

15. The method of claim 12, wherein the modulator of each unit cell provides correlated phase-shifts to the light having the multiple polarizations.

16. The method of claim 11, wherein:
each unit cell comprises multiple antenna elements that are spatially separated; and
each unit cell further comprises a birefringent material that spatially separates the light having different ones of the multiple polarizations.

17. The method of claim 11, wherein each unit cell comprises multiple antenna elements that spatially overlap one another.

18. The method of claim 11, wherein each unit cell comprises a multi-polarization antenna element.

19. The method of claim 11, wherein the modulator of each unit cell comprises one of:
a thermal resonator having a micro-ring resonator and a heater; and
a PN junction modulator.

20. The method of claim 11, wherein the optical phased array includes at least one million unit cells.

* * * * *